US010477472B2

United States Patent
Prasad et al.

(10) Patent No.: US 10,477,472 B2
(45) Date of Patent: *Nov. 12, 2019

(54) OPTIMIZING ENERGY EFFICIENCY OVER ENERGY-HARVESTING LTE CELLULAR NETWORKS

(71) Applicant: NEC Laboratories America, Inc., Princeton, NJ (US)

(72) Inventors: Narayan Prasad, Willow Grove, PA (US); Sampath Rangarajan, Bridgewater, NJ (US); Hajar Mahdavi-Doost, Edison, NJ (US)

(73) Assignee: NEC Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/271,064

(22) Filed: Sep. 20, 2016

(65) Prior Publication Data

US 2017/0111861 A1    Apr. 20, 2017

Related U.S. Application Data

(60) Provisional application No. 62/286,799, filed on Jan. 25, 2016, provisional application No. 62/242,622, filed on Oct. 16, 2015.

(51) Int. Cl.
*H04W 72/12* (2009.01)
*H04W 52/02* (2009.01)

(52) U.S. Cl.
CPC ... *H04W 52/0216* (2013.01); *H04W 72/1273* (2013.01)

(58) Field of Classification Search
CPC .............. H04W 52/0216; Y02B 60/50; Y02D 70/1262; Y02D 70/1264
See application file for complete search history.

(56) References Cited

U.S. PATENT DOCUMENTS

| 2007/0191076 A1* | 8/2007 | Hageman | ......... H04W 52/0261 455/574 |
| 2014/0011543 A1* | 1/2014 | Li | .................... H04W 52/0206 455/561 |

(Continued)

OTHER PUBLICATIONS

Mandavi-Doost et al.,Optimizing energy efficiency over energy-harvesting LTE cellular networks,Pub in:Information Theory (ISIT), 2016 IEEE International Symposium on Conference Date: Jul. 10-15, 2016 Date Added to IEEE Xplore: Aug. 11, 2016 Electronic ISSN: 2157-8117 INSPEC Accession No. 16229228 (Year: 2016).*

(Continued)

*Primary Examiner* — Gary Mui
(74) *Attorney, Agent, or Firm* — Joseph Kolodka

(57) ABSTRACT

A method is provided for optimizing energy efficiency over an energy-harvesting Long Term Evolution cellular network. The method includes assigning (a) resource blocks, (b) transmission modes, and (c) bit loadings on the resource blocks to a set of users such that (i) the assigned resource blocks satisfy a system of linear ascending inequality constraints, and (ii) respective sums of the bit loadings for each of the users do not exceed respective queue sizes pertaining to the each of the users. The method further includes incorporating a resource block and transmission mode assignment for a user into downlink scheduler of a base station to cause the downlink scheduler to perform downlink scheduling in accordance with the resource block and transmission mode assignment.

20 Claims, 7 Drawing Sheets

(56) References Cited

U.S. PATENT DOCUMENTS

2014/0036877 A1* 2/2014 Campbell ............ H04W 72/10
370/336
2015/0305054 A1* 10/2015 Elfstrom ........... H04W 52/0261
455/452.1

OTHER PUBLICATIONS

Jangsher et al, Joint Allocation of Resource Blocks, Power, and Energy-Harvesting Relays in Cellular Networks,Published in: IEEE Journal on Selected Areas in Communications ( vol. 33, Issue: 3, Mar. 2015 )p. 482-495 Date of Pub: Jan. 13, 2015 Print ISSN: 0733-8716 INSPEC Accession No: 15000538 (Year: 2015).*

Azar, et al., "Efficient Submodular Function Maximization Under Linear Packing Constraints," 39th Intl. Colloquium on Automata, Languages and Programming, Apr. 2012, pp. 1-18.

Tutuncuoglu, et al., "Sum-rate Optimal Power Policies for Energy Harvesting Transmitters in an Interference Channel," CoRR, vol. abs/1110.6161, Feb. 2012, pp. 1-10.

Lee, et al., "Downlink mimo with Frequency-domain Packet Scheduling for 3gpp lte," in IEEE Infocom, Apr. 2009, pp. 1-9.

Andrews, et al., "Scheduling Algorithms for Multi-carrier Wireless Data Systems," IEEE/ACM Transactions on Networking, Apr. 2011,pp. 447-455, vol. 19, No. 2.

Ng, et al., "Energy-efficient Resource Allocation in OFDMA Systems with Large Numbers of Base Station Antennas," IEEE Transactions on Wireless Communications, Sep. 2012, pp. 3292-3304, vol. 11, No. 9.

Venturino, et al., "Energy-efficient Scheduling and Power Allocation in Downlink OFDMA Networks with Base Station Coordination," IEEE Trans. on Wireless Comm., Jan. 2015, pp. 1-14, vol. 14.

Ahmed, et al., "Queue-aware Optimal Resource Allocation for the LTE Downlink", Globecom 2013 Wireless Comminication Symposium, Dec. 2013, 7 pages.

Wang, et al., "Energy-subchannel allocation for energy harvesting nodes in frequency-selective channels," in Information Theory (ISIT), 2015 IEEE International Symposium on, pp. 2712-2716, Jun. 2015.

Ozel,et al., "Transmission with Energy Harvesting Nodes in Fading Wireless Channels: Optimal policies," Selected Areas in Communications, IEEE Journal, Sep. 2011, pp. 1732-1743, vol. 29.

Lin, et al., "Multi-document Summarization Via Budgeted Maximization of Submodular Functions," in HLT10: Human Language Technologies, Jun. 2010, pp. 912-920.

* cited by examiner

OPTIMIZING ENERGY EFFICIENCY OVER ENERGY-HARVESTING LTE CELLULAR NETWORKS

RELATED APPLICATION INFORMATION

This application claims priority to application No. 62/242,622 filed on Oct. 16, 2015, and application No. 62/286,799, filed Jan. 25, 2016, each incorporated herein by reference in its entirety.

BACKGROUND

Technical Field

The present invention relates to optimizing energy efficiency and, more particularly, to optimizing energy efficiency over energy-harvesting Long-Term Evolution (LTE) cellular networks.

Description of the Related Art

Deployment of energy harvesting devices to harness renewable energy sources in Long-Term Evolution (LTE) cellular networks offers two-fold advantages. It reduces the carbon footprint of the LTE networks and potentially also extends the lifetime of such systems. This is particularly vital as some parts of the network are not easily accessible for regular maintenance. However, a renewable energy source providing a gradual and unreliable energy supply adds an energy causality constraint to such systems, which needs to be considered for radio resource management.

Energy efficiency is becoming an increasingly popular paradigm in wireless networks. The main motivation behind energy efficient resource allocation is to reliably transmit as many bits as possible for every joule of energy spent, thereby ensuring that the explosive growth in wireless services is managed with as low a carbon footprint as possible.

Thus, there is a need for optimizing energy efficiency over energy-harvesting LTE cellular networks.

SUMMARY

According to an aspect of the present invention, a method is provided for optimizing energy efficiency over an energy-harvesting Long Term Evolution cellular network. The method includes assigning (a) resource blocks, (b) transmission modes, and (c) bit loadings on the resource blocks to a set of users such that (i) the assigned resource blocks satisfy a system of linear ascending inequality constraints, and (ii) respective sums of the bit loadings for each of the users do not exceed respective queue sizes pertaining to the each of the users. The method further includes incorporating a resource block and transmission mode assignment for a user into downlink scheduler of a base station to cause the downlink scheduler to perform downlink scheduling in accordance with the resource block and transmission mode assignment.

According to another aspect of the present invention, a computer program product is provided for performing downlink scheduling in Long Term Evolution-Advanced networks. The computer program product includes a computer readable storage medium having program instructions embodied therewith. The program instructions are executable by a computer to cause the computer to perform a method. The method includes assigning (a) resource blocks, (b) transmission modes, and (c) bit loadings on the resource blocks to a set of users such that (i) the assigned resource blocks satisfy a system of linear ascending inequality constraints, and (ii) respective sums of the bit loadings for each of the users do not exceed respective queue sizes pertaining to the each of the users. The method further includes incorporating a resource block and transmission mode assignment for a user into downlink scheduler of a base station to cause the downlink scheduler to perform downlink scheduling in accordance with the resource block and transmission mode assignment.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
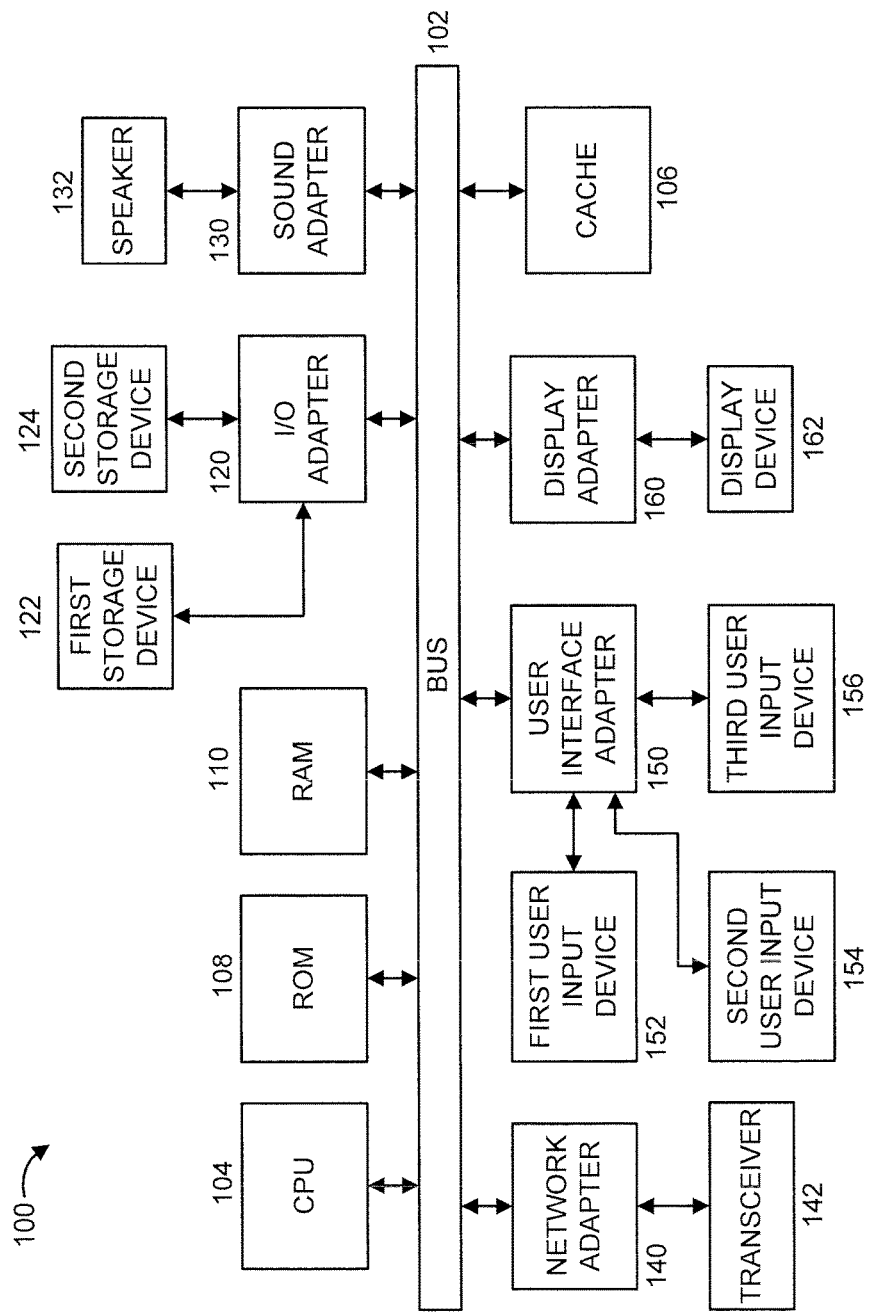
FIG. 1 shows an exemplary processing system 100 to which the present principles can be applied, in accordance with an embodiment of the present principles.

In accordance with the present principles, systems and methods are provided for optimizing energy efficiency over energy-harvesting Long-Term Evolution (LTE) cellular networks.

In an embodiment, the present principles optimize energy efficiency metrics over wireless networks that conform to the LTE standard (henceforth referred to as "LTE networks"). Optimizing energy efficiency over LTE networks requires us to carefully account for certain mandatory constraints placed by the LTE standard on the choice of transmission parameters. In an embodiment, we ignore such constraints and then invoke the available results. The solution so obtained can be appropriately modified to ensure feasibility. In an embodiment, an alternate approach seeks to incorporate as many constraints as possible in the problem formulation itself, with the caveat that the resulting formulation should be tractable.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary processing system 100, to which the present invention may be applied, is illustratively depicted in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
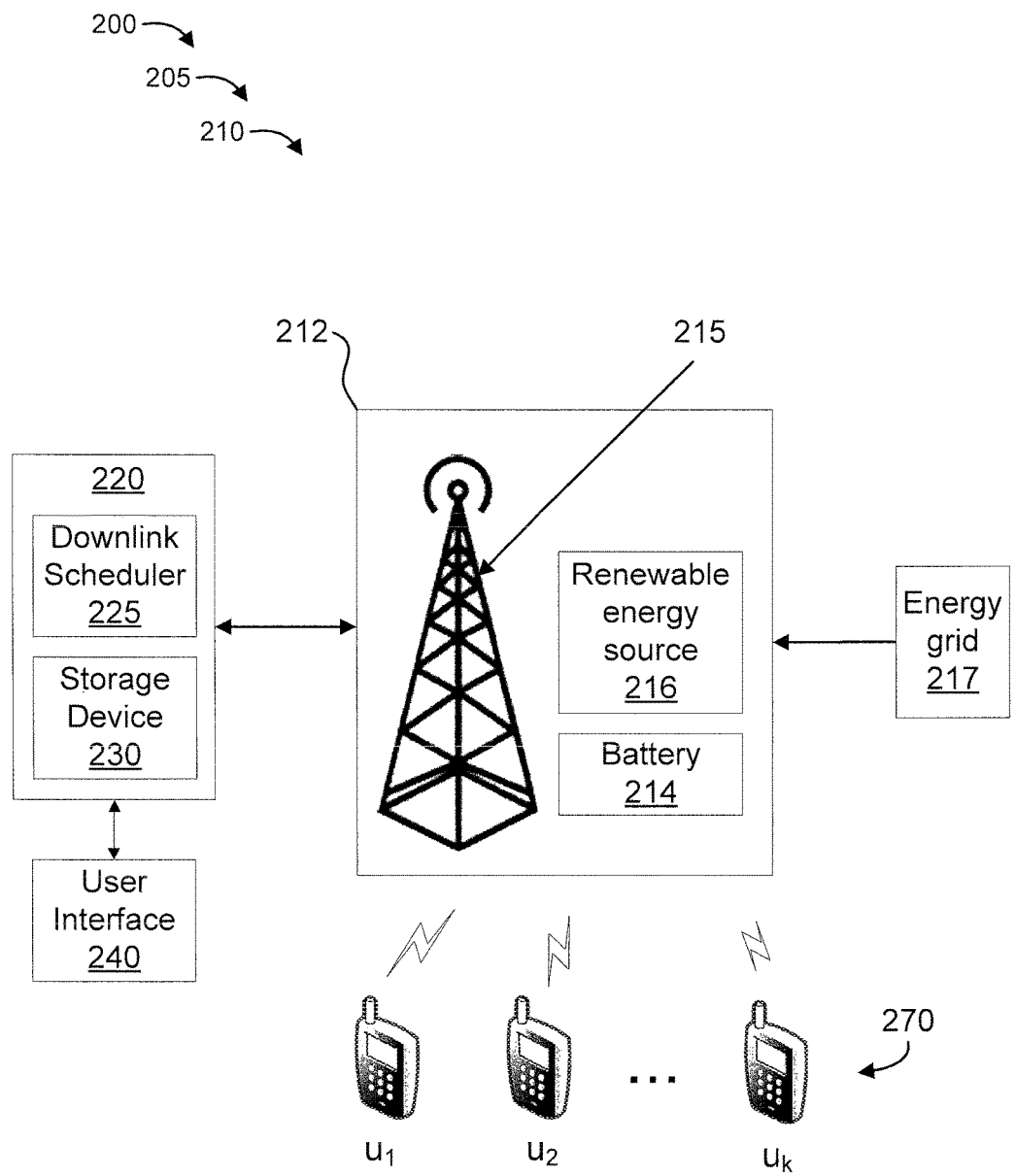
FIG. 2 shows an exemplary system 200 for optimizing energy efficiency over energy-harvesting LTE cellular networks, in accordance with an embodiment of the present invention.
Figure 3:
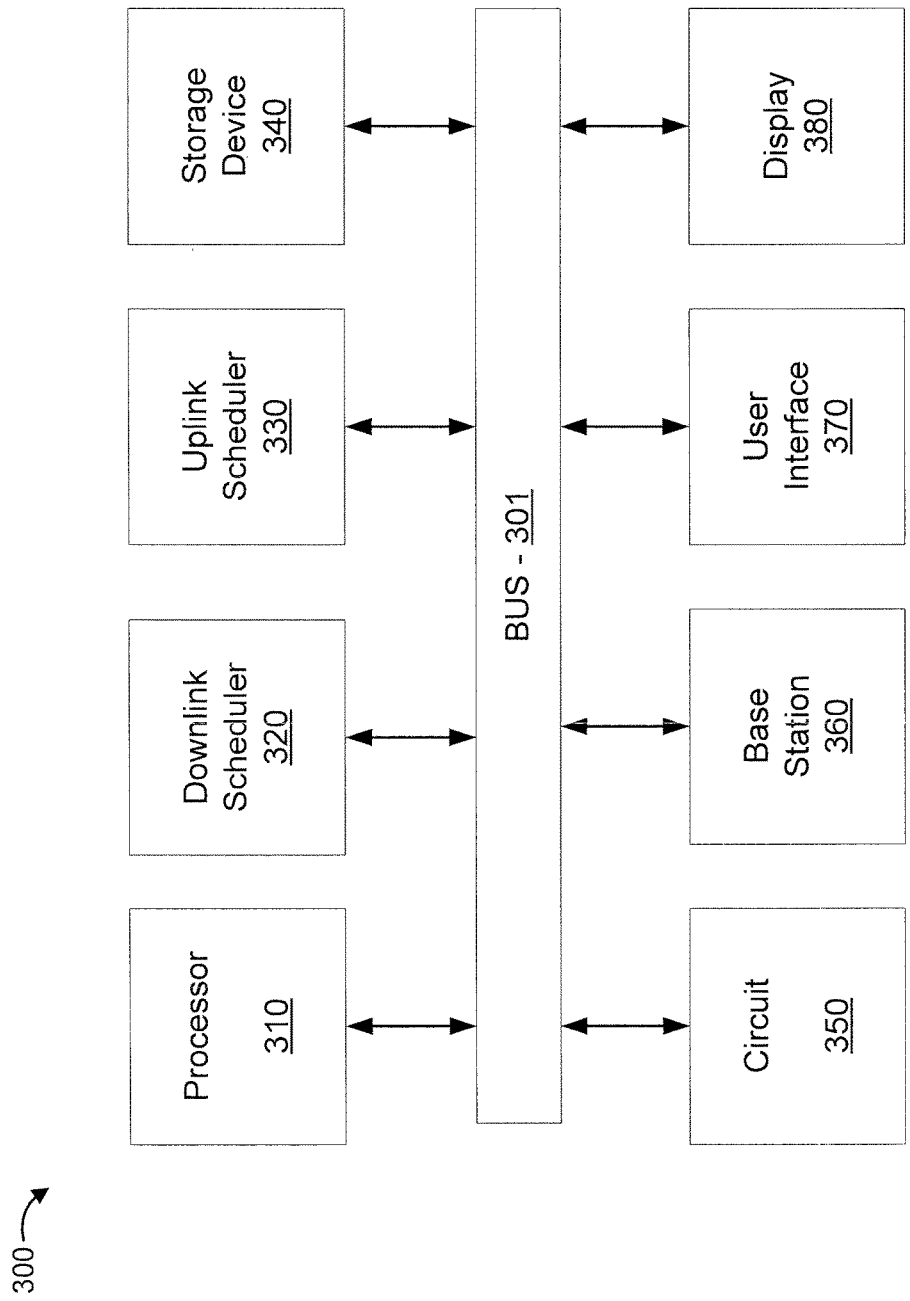
FIG. 3 shows an exemplary system 300 for downlink scheduling in LTE cellular networks, in accordance with an embodiment of the present principles.

Moreover, it is to be appreciated that systems 200 and 300, described with respect to FIG. 2 and FIG. 3, respectively, are systems for implementing respective embodiments of the present invention. Part or all of processing system 100 may be implemented in one or more of the elements of systems 200 and 300 according to various embodiments of the present invention.

Figure 5:
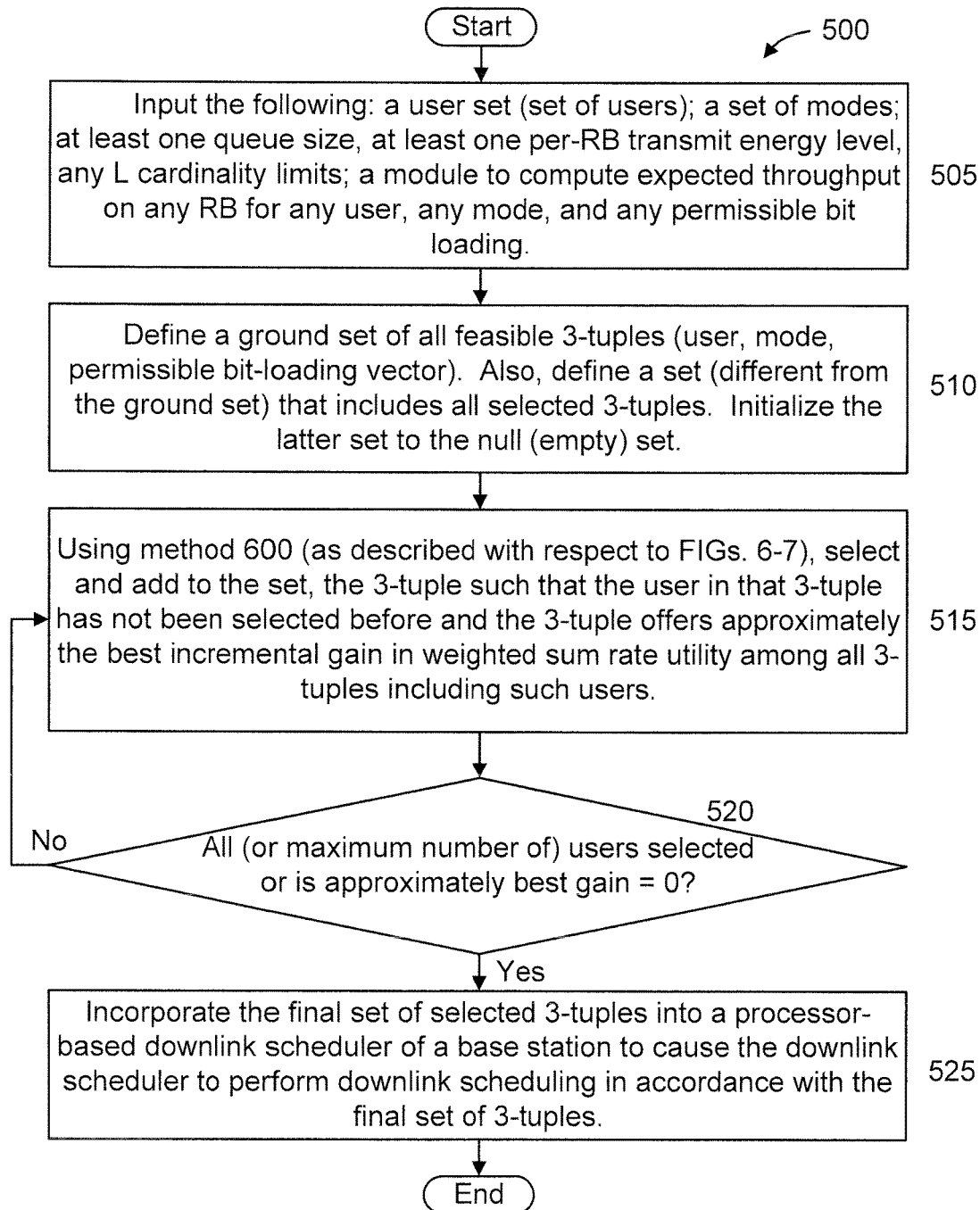
FIG. 5 shows an exemplary method 500 for optimizing energy efficiency over energy-harvesting LTE cellular networks, in accordance with an embodiment of the present principles.
Figure 6:
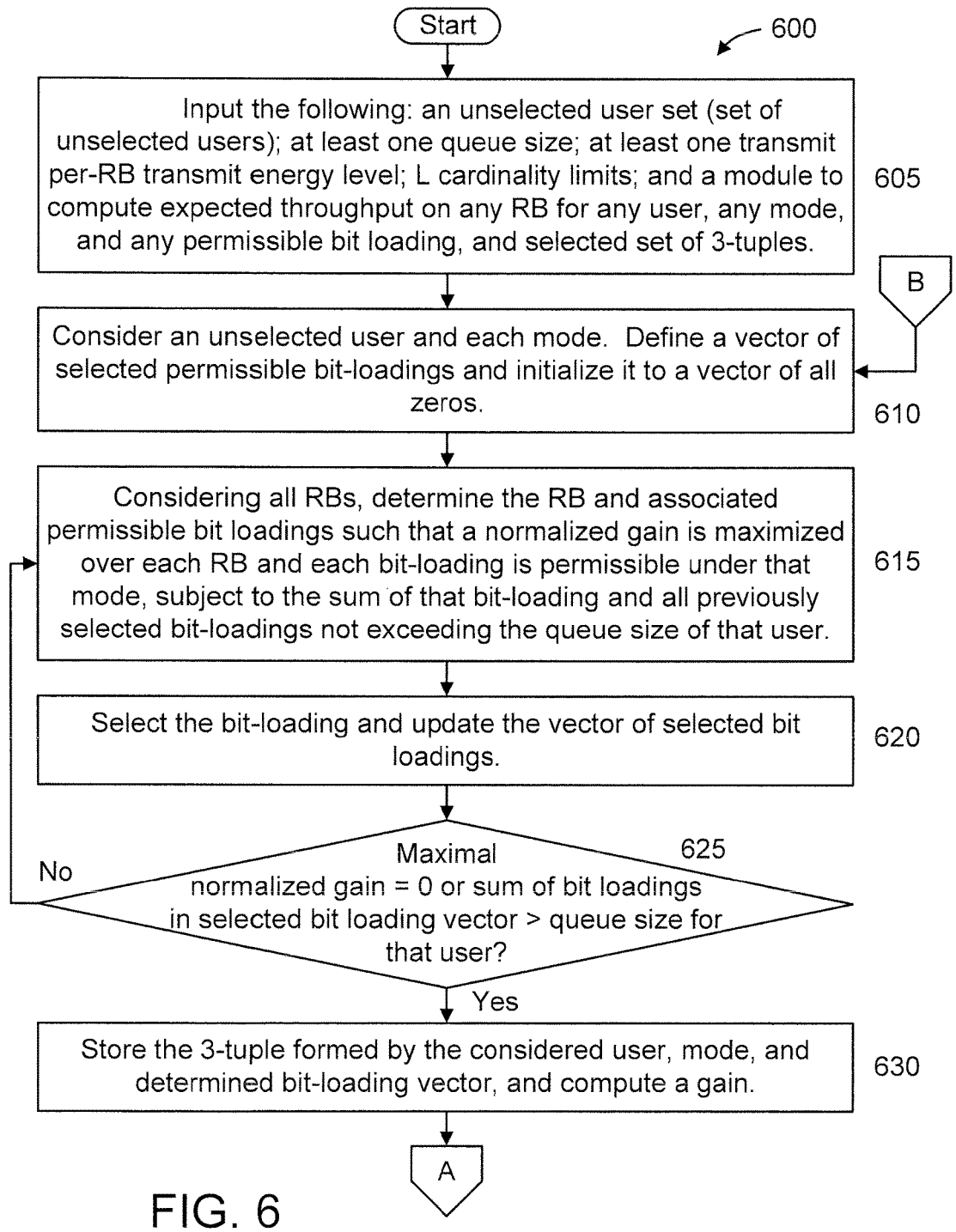
FIGS. 6-7 show another exemplary method 600 for optimizing energy efficiency over energy-harvesting LTE cellular networks, in accordance with an embodiment of the present principles.
Figure 7:
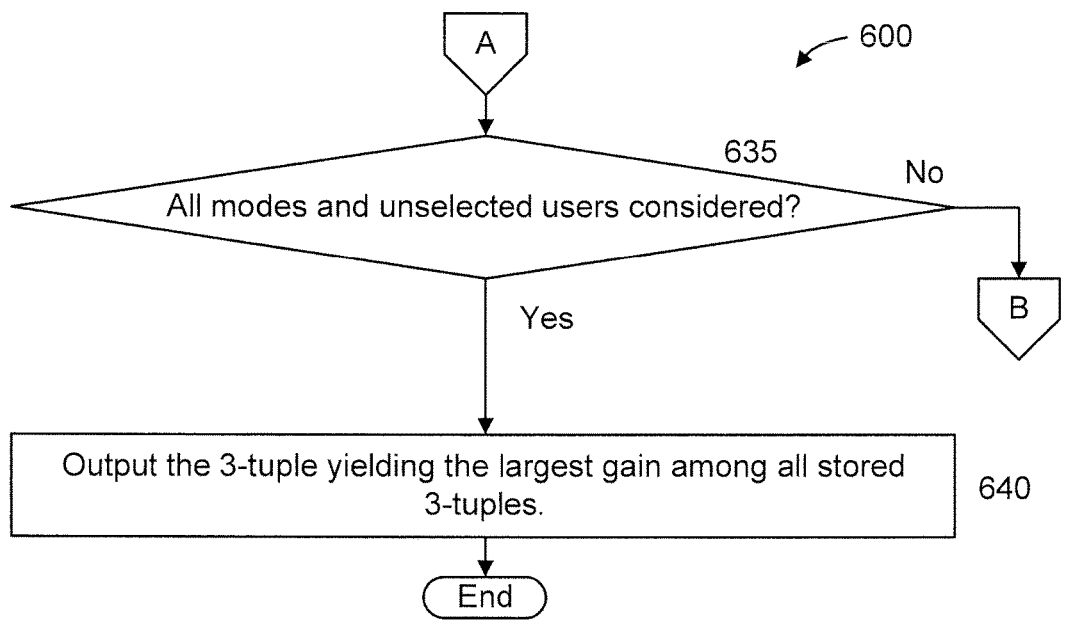

Further, it is to be appreciated that processing system 100 may perform at least part of the method described herein including, for example, at least part of method 500 of FIG. 5 and/or at least part of method 600 of FIG. 6-7. Similarly, part or all of systems 200 and 300 may be used to perform at least part of method 500 of FIG. 5 and/or at least part of method 600 of FIGS. 6-7 according to various embodiments of the present invention.

Referring now to FIG. 2, an exemplary system 200 for optimizing energy efficiency over energy-harvesting LTE cellular networks is illustratively depicted in accordance with an embodiment of the present invention.

For the sake of illustration, a single-cell 210 in an LTE network 205 includes a base station 212, equipped with a battery 214 of infinite storage capacity, and a renewable energy source 216 (such as, e.g., solar power cells, wind power turbines, etc.) producing renewable energy. A conventional source of energy from an energy grid 217 may also be available. According to an embodiment of the present principles, the base station 212 in the single-cell 210 serves K active users (i.e., K active user equipments), $u_1$ through $u_k$, 270.

In an embodiment, the base station 212 is powered by both the battery 214 and the renewable energy sources 216.

System 200 further includes a processor 220. The processor 220 computes in each subframe a final set of 3-tuples from a set of users and their weights, a set of transmission modes and a set of permissible bit loadings under those modes, a list of queues, a list of normalized costs for each resource block in a set of resource blocks, a ground set of 3-tuples, each 3-tuple including a user from the set of users, a transmission mode from a set of transmission modes, and a bit-loading vector.

The processor 220 includes a storage device 230, configured to store the at least a set of users, the set of transmission modes, the list of queues, the list of normalized costs for each resource block in the set of resource blocks, the ground set of 3-tuples, and the final set of 3-tuples.

The processor 220 further includes a downlink scheduler 225 configured to schedule downlink transmission 215 from the base station 212 to the users.

The system 200 further includes a user interface 240 connected to the processor 220 to enable a user receive the downlink transmission determined as per the downlink scheduler 225.

While shown external to the base station 212, the processor 220 can be part of the base station or implemented in a distributed configuration remote from the base station. Similarly, the user interface 240 can be part of a user equipment 270. These and other variations of system 200 are readily determined by one of ordinary skill in the art, given the teachings of the present invention provided herein, while maintaining the spirit of the present invention.

Optimizing energy efficiency over networks that conform to the LTE standard requires accounting for certain mandatory constraints placed by the LTE standard on the choice of transmission parameters.

Referring now to FIG. 3, an exemplary system 300 for downlink scheduling in LTE networks is illustratively depicted in accordance with an embodiment of the present invention.

While many aspects of system 300 are described in singular form for the sakes of illustration and clarity, the same can be applied to multiples ones of the items mentioned with respect to the description of system 600. For example, while a single downlink scheduler 320 may be mentioned with respect to system 300, more than one downlink scheduler 320 can be used in accordance with the teachings of the present principles, while maintaining the spirit of the present principles. Moreover, it is appreciated that the downlink scheduler 320 is but one aspect involved with system 300 than can be extended to plural form while maintaining the spirit of the present principles.

In an embodiment, the system 300 may include a plurality of components, which may include one or more processors, downlink schedulers 320, uplink schedulers 330, storage devices (e.g., computer readable storage medium) 340, circuits 350, base stations 360, user interfaces 370, and/or displays. The above components may be connected by, for example, a bus 301, and data (e.g., system condition data, temperature, voltage, etc.) may be collected according to various embodiments of the present principles. The bus may be connected to any components via a wired or wireless connection.

In an embodiment, a processor 310 may be employed to determine a final set of 3-tuples, based on information, such as a user set, transmission modes, and bit-loading data, stored on the storage device 340. In an embodiment, a downlink scheduler 320 may be employed to perform downlink scheduling at a base station 360, based on the final set of 3-tuples. In an embodiment, the downlink scheduler 320 is processor-based.

In an embodiment, a user interface 370 may be employed to enable a user to input any or all of the data parameters used by the downlink scheduler 320.

In an embodiment, at least one display 380 may be employed to display any of the information and data input or output from the system 300.

Figure 4:
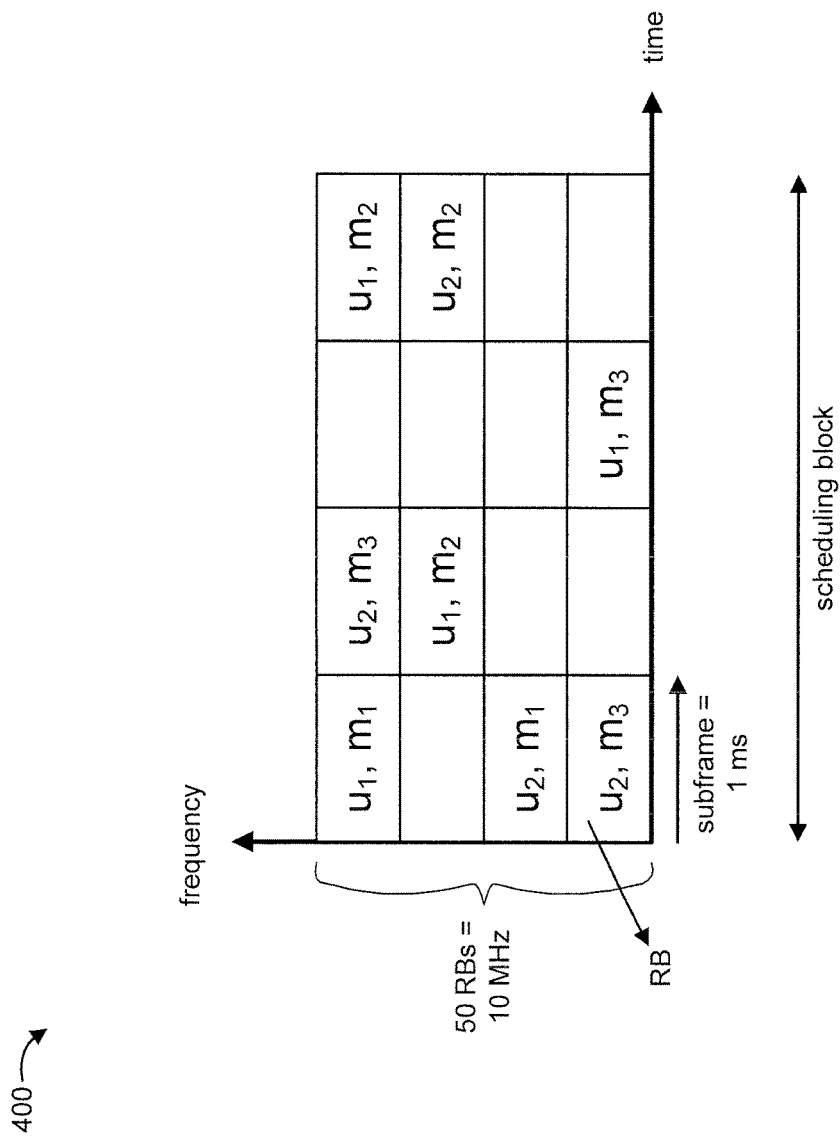
FIG. 4 shows an exemplary resource allocation graph 400, in accordance with an embodiment of the present principles.

Referring now to FIG. 4, an exemplary resource allocation graph 300 is illustratively depicted in accordance with an embodiment of the present principles.

In the resource allocation graph 400, the x-axis denotes time, and the y-axis denotes frequency. Over each subframe (of duration 1 millisecond), the available bandwidth for the base station 212 is partitioned into N time-frequency units referred to as Resource Blocks (RBs). Each RB represents a slice of the available bandwidth in a scheduling interval and is the minimum assignable time-frequency resource unit. As shown in FIG. 4, RBs are allocated to the user, u, and a mode, m. Modes represent, but are not limited to, transmission diversity, spatial multiplexing, precoding, and transmission rank.

The base station 212 is equipped with a battery of infinite storage capacity and a renewable energy source that provides energy $E_l$ (Joules) in subframe l. It is assumed that $E_l$ can be accurately estimated in advance, which is true for a renewable energy source (such as, e.g., solar, wind, hydroelectric, etc.) and can be accurately predicted for durations up to, e.g., one hour.

A practical setup is then incorporated wherein the channel estimates are known in advance for each block of L contiguous subframes, i.e., at the beginning of each block, channel estimates for all users for each one of the subframes in that block are available at a base station scheduler.

While such a non-causal assumption might seem implausible, in a practical system, channel estimates are obtained from each user with a certain periodicity (such as, e.g., 5 or 10 ms in LTE networks). A very typical assumption (for low mobility scenarios) is to treat the user channels (on each RB) as blocks fading with a coherence time equal to the configured periodicity. Then, without loss of generality, a block of L contiguous subframes is considered and the block index is suppressed. N is defined as $N=N_1 \cup N_2 \ldots N_L$, where $N_l=\{(l-1)N+1, \ldots, lN\}$ denotes the set including RBs in the $l^{th}$, $l=1, \ldots, L$ subframe.

Figures of merit pertaining to energy efficiency are considered and optimized under a set of important practical LTE constraints. In particular, these constraints are:

C1. An Orthogonal Frequency-Division Multiple Access (OFDMA) orthogonality constraint on each RB. At most, one user can be scheduled on each RB. Also, the number of users scheduled in the block cannot exceed a certain threshold, $\bar{K}$. The latter constrain helps in reducing the control channel signaling overhead.

C2. The transmission mode on all of the RBs allocated to the same user needs to be identical over the scheduling block. Each transmission mode must be selected from a given finite set. This generic constraint is very useful in incorporating several practical and mandatory ones.

C3. The bit loading on any RB must conform to choices permissible under the selected mode. In addition, to address the bursty user traffic demands, the total number of bits assigned to each scheduled user u must not exceed its queue (buffer) size $Q_u$.

C4. The transmit energy, $\rho$, expended over each RB used for data transmission should be identical. Furthermore, this common per-RB transmit energy, $\rho$, must be chosen from a finite set P. It is assumed that P has only strictly positive entries.

C5. The per-RB energy, $\rho$, together with the number of used RBs, should not violate the energy harvesting constraints. The energy causality requires that the energy used till the end of any subframe does not exceed the energy available by that subframe. Consequently, for any given energy per-RB, ρ, and the energy per-subframe, l, $E_l$, the L RB cardinality limits, $J_1, \ldots, J_L$, are first determined, which define a system of linear ascending inequality constraints, henceforth referred to as linear inequalities. In particular, the number of assigned RBs in the first subframe should not exceed $$J_1 = \left\lfloor \frac{E_0 + E_1 - \vartheta}{\gamma\rho} \right\rfloor,$$

where $E_0$ denotes the energy stored in the battery at the start of the block, $\partial \geq 0$ represents the circuit energy consumed over each subframe, and $\gamma \geq 1$ is the inverse of the power amplifier efficiency and $\lfloor \cdot \rfloor$ denotes the floor operation. Further, the number of assigned RBs in the first and second sub-frames together should not exceed $$J_1 + J_2 = \left\lfloor \frac{E_0 + E_1 + E_2 - 2\vartheta}{\gamma\rho} \right\rfloor,$$

and so on. In another variation, RBs are used in a block only after guaranteeing that the energy available at the start of the next one exceeds the required circuit energy. In each case, the linear inequalities arise due to increasing renewable energy that is available as the subframes are traversed.

The following two energy efficiency metrics, Global Energy Efficiency (GEE) and Weighted Sum of Energy Efficiencies (WSEE), are considered and are defined to conform to the identical energy per RB constraint (C4).

GEE: Ratio of the weighted sum rate (computed per block) and the corresponding energy consumption (Joules per block):

$$GEE(\rho, J, R) = \frac{\sum_{n \in R} \psi_n R_n}{L\vartheta + J\gamma\rho}, \quad (1)$$

where $R \subseteq N$ denotes the set of RBs chosen for data transmission over L subframes. J denotes the number of used RBs (i.e., the cardinality of the set R) and R denotes the rate (throughput) achieved on RB $n \in R$. $\psi_n, \forall n \in N$ denote the weights (or priorities) assigned to all the available RBs.

WSEE:

$$WSEE(\rho, J, R) = \sum_{n \in R} \psi_n \frac{R_n}{\delta + \gamma\rho}, \quad (2)$$

where $\delta > 0$ represents the total circuit energy $L\partial$ amortized over all NL RBs in the block, i.e., $$\delta = \frac{\vartheta}{N}.$$

Each one of the two metrics (GEE, WSEE) are optimized (in each scheduling block) over the choice of the per-RB energy, ρ, the number of used RBs, J, the set R of cardinality J, and the choice of users (with their respective modes and bit loading) scheduled on those RBs, subject to the set of constraints, C1-C5, described above.

According to an aspect of the present invention, it has been observed that, without loss of generality, each $J_l$ can be replaced with $\tilde{J}_l$: $\tilde{J}_l \leq N$, $\forall l=1, \ldots, L$ which are recursively defined as $$\tilde{J}_l = \min\left\{N, J_l + \sum_{q=1}^{l-1}(J_q - \tilde{J}_q)\right\}, \forall l = 1, \ldots, L.$$

To verify this observation, consider any set of RBs $R \subseteq N$ that is feasible under the linear inequalities defined by $\{J_l\}_{l=1}^L$, i.e., $|R \cap \{\cup_{j=1}^l N_j\}| \leq \sum_{j=1}^l J_j, \forall l=1, \ldots, L$. It can be verified that $R \subseteq N$ that is feasible under the corresponding linear inequalities defined by $\{\tilde{J}_l\}_{l=1}^L$, as well. Consequently, with a slight abuse of notation, henceforth $J_l$ is used to denote $\tilde{J}_l$, $\forall l=1, \ldots, L$ so that $J_l \leq N$, $\forall l$.

Next, to formally define the optimization problems, the expected throughput or rate (in bits per RB), obtained upon scheduling user u with mode m on RB n and loading $b_n$ bits, as $$b_n(1-p_{u,n}^m(b_n,\rho)), b_n \in B^m, \quad (3)$$

where $p_{u,n}^m(b_n, \rho)$ is the corresponding error probability. $B^m$ denotes the set of all permissible bit loadings that can be done on any RB under mode m. It is supposed that $0 \in B^m$, $\forall m$ and define $B_{max}^m = \max\{b: b \in B^m\}$. The set $B^m$ can be any arbitrary finite set or it can be an uncountable, albeit compact set. The throughput in Equation (3) (for all users, modes, RBs, and bit loadings) can be computed (if needed) by the base station scheduler based on the available Channel State Information (CSI), which can be imperfect. A special case of this model is the common 0-1 model, wherein each error probability is a step function and each $B^m$ is a closed interval.

The two problems of interest, according to the present invention, are defined as follows:

$$\max\{GEE(\rho,J,R)\} s \cdot t \cdot C1, C2, C3, C4, \& C5 \quad (PI)$$

$$\max\{WSEE(\rho,J,R)\} s \cdot t \cdot C1, C2, C3, C4, \& C5 \quad (PII)$$

In order to solve these two problems ((PI) and (PII)), $x_{u,n}^m$ is defined as the indicator variable, which is equal to one if the user u is scheduled on RB n with transmission mode m, and equal to zero otherwise, and define a key sub-problem of maximizing the weighted sum rate for any given ρ and J.

$$\max_{\{x_{u,n}^m, b_{u,n}^m\}} \sum_{u=1}^K \sum_{l=1}^L \sum_{n \in N_l} \sum_{m=1}^M \psi_n' x_{u,n}^m b_{u,n}^m (1 - p_{u,n}^m \quad (4)$$

$$(b_{u,n}^m, \rho))$$

subject to $\sum_{m=1}^M \sum_{u=1}^K x_{u,n}^m \leq 1, n \in N$ $$\sum_{u=1}^K \sum_{m=1}^M \max_{n \in N} x_{u,n}^m \leq \overline{K}$$

$$\sum_{m=1}^M \max_{n \in N} x_{u,n}^m \leq 1, 1 \leq u \leq \overline{K}$$

$$\sum_{n \in N_1 \cup \ldots \cup N_l} \sum_{u=1}^K \sum_{m=1}^M x_{u,n}^m \leq$$

$$\min\left\{\sum_{q=1}^l J_q, J\right\}, \forall l$$

$$\sum_{m=1}^M \sum_{n \in N} b_{u,n}^m \leq Q_u, 1 \leq u \leq \overline{K}$$

-continued $$x_{u,n}^m \in \{0, 1\} \; \& \; b_{u,n}^m \in B^m, \; \forall \, u, m, n.$$

where $\{\psi'_n\}_{n \in N}$ are given weights, and $b_{u,n}^m$ denotes the number of information bits allocated on RB n when user u is assigned to that RB with transmission mode m. The first and second sets of constraints describe the OFDMA orthogonality constraint and the user limit constraint, respectively (constraint C1). The third set of constraints stipulates that each user can only have one transmission mode across all RBs allocated to it (constraint C2). Similarly, the fourth constraint dictates that the total number of all occupied RBs should be no greater than J while satisfying the energy causality constraint (C5). The penultimate and the last sets of constraints enforce the queue size limit for each user and permissible bit loadings (constraint C3). Notice that Equation (4) is a sub-problem of both (PI) and (PII), obtained for any choice of ρ and J, upon setting $$\psi'_n = \psi_n / (L\vartheta + \gamma \rho J) \text{ and } \psi'_n = \frac{\psi_n}{(\delta + \gamma \rho)}, \; \forall \, n,$$

respectively.

This observation yields the result that any a-approximation algorithm for the weighted sum rate (WSR) maximization problem in Equation (4) (for any constant $\alpha \in (0, 1]$) can be used to design a-approximation algorithms for problems (PI) and (PII). Note also that in Equation (4) there is imposed a one user-limit constraint and a one common mode constraint for each user.

Suppose that, for each $\rho \in P$, the following condition is satisfied:

$$\exists \, (u^*, m^*, n^*) = \arg\max_{u \in U, m \in M, n \in N} \{\psi_n r_{u,n}^{-m}(\rho)\} \quad (5)$$

$$\text{s.t.} \; \frac{\psi_{n^*} r_{u^*,n^*}^{-m^*}(\rho)}{L\vartheta + \gamma \rho} \geq \max_{u \in U, n \in N: (u,n) \neq (u^*, n^*) \& m \in M} \{\psi_n r_{u,n}^{-m}(\rho)\}$$

where $r_{u,n}^{-m}(\rho) = \max_{b \in B^m} \{b(1 - p_{u,n}^m(b, \rho))\}$

Then, the optimal solution to (PI) is given by $$\max_{\rho \in P} \max_{u \in U, m \in M, n \in N} \left\{ \frac{\psi_n r_{u,n}^{-m}(\rho)}{L\vartheta + \gamma \rho} \right\} \quad (6)$$

The simple but key observation that supports this proposition is that, for any non-negative scalars a, b, c, d, such that $b \neq 0$, $d \neq 0$, $$\frac{a}{b} \geq \frac{c}{d} \Leftrightarrow \frac{a}{b} \geq \frac{a+c}{b+d} \quad (7)$$

Recalling Equation (1), let $\hat{R}$, $\hat{J}$ denote the set of RBs and its cardinality that is optimal with respect to the GEE at some ρ, and let $\{\hat{R}_n\}_{n \in \hat{R}}$ denote the weighted rates achieved on those RBs. Further, without loss of generality, suppose that $\hat{R} = \{n_1, \ldots, n_{\hat{J}}\}$ and $\hat{R}_{n_1} \geq \hat{R}_{n_2} \geq \ldots \geq \hat{R}_{n_{\hat{J}}}$. Then, suppose that Equation (5) holds at that ρ and suppose that u* is present in the optimal solution at hand. In this case, let $n_l \in \{n_1, \ldots, n_{\hat{J}}\}$ be an RB such that $n_l = n^*$ if user u* has been assigned RB n* in that optimal solution, otherwise $n_l$ can be chosen to be any RB assigned to user u* in that optimal solution. Then, invoking Equation (5) with Equation (7), the following chain of inequalities is produced:

$$\frac{\hat{R}_{n_1} + \hat{R}_{n_2} + \ldots + \hat{R}_{n_{\hat{J}}}}{L\vartheta + \hat{J}\gamma\rho} \leq$$

$$\frac{\hat{R}_{n_1} + \ldots + \hat{R}_{n_{l-1}} + \psi_{n^*} r_{u^*,n^*}^{-m^*}(\rho) + \hat{R}_{n_{l+1}} + \ldots + \hat{R}_{n_{\hat{J}}}}{L\vartheta + \hat{J}\gamma\rho} \leq$$

$$\frac{\hat{R}_{n_1} + \ldots + \hat{R}_{n_{l-1}} + \psi_{n^*} r_{u^*,n^*}^{-m^*}(\rho) + \hat{R}_{n_{l+1}} + \ldots + \hat{R}_{n_{\hat{J}-1}}}{L\vartheta + (\hat{J} - 1)\gamma\rho} \leq$$

$$\frac{\hat{R}_{n_1} + \psi_{n^*} r_{u^*,n^*}^{-m^*}(\rho)}{L\vartheta + 2\gamma\rho} \leq \frac{\psi_{n^*} r_{u^*,n^*}^{-m^*}(\rho)}{L\vartheta + \gamma\rho}$$

which settles the result. The case when u* is not present in the optimal solution at hand can be proved in a similar manner.

Notice that, since the set P is assumed to contain only strictly positive entries, the GEE is well-defined even when $\partial = 0$, which implies that a GEE optimal solution involves using only one RB and can be efficiently determined for this case.

A ground set is defined. Equation (4) is reformulated and, towards this end, a ground set containing all possible 3-tuples is defined as $\Psi = \{(u, m, b)\}$, wherein, for each such 3-tuple (or element), $\underline{e} = (u, m, b)$, u denotes the user, m denotes the mode, and $\underline{b} = [b_1, \ldots, b_{NL}]^T \in \mathbb{R}_+^{NL}$ is an NL length bit loading vector such that, for each RB, $n \in N$, the bit loading is permissible, i.e., $b_n \in B^m$, and across all RBs the buffer (queue) constraint is satisfied, i.e., $\Sigma_{n \in N} b_n \leq Q_u$. Furthermore, a family of subsets of '$\Psi$', denotes by $\underline{I}$, is defined as follows:

$$A \subseteq \Psi: \Sigma_{(u', m', b') \in A} 1\{u' = u\} \leq 1 \, \forall u \in U \, \& \, |A| \leq \overline{K} \Leftrightarrow A \in \underline{I}.$$

In words, any subset of 3-tuples from $\Psi$ in which each user appears at most once and whose cardinality does not exceed the user limit $\overline{K}$ is a member of $\underline{I}$. Then, a normalized non-negative set function is defined as $h: 2^\Psi \to \mathbb{R}_+$, such that $h(\emptyset) = 0$ and, for all other subsets $A \subseteq \Psi$:

$$h(A) = \max_{z_n \in \{0, 1\} \forall n} \left\{ \sum_{n \in N} z_n \max_{(u, m, b) \in A} \{\psi_n b_n (1 - p_{u,n}^m(b_n, \rho))\} \right\}, \quad (8)$$

$$\text{s.t.} \sum_{n \in \bigcup_{j=1}^{l} N_j} z_n \leq \min\left\{J, \sum_{q=1}^{l} J_q\right\}, \; \forall \, l = 1, \ldots, L.$$

The problem in (4) can now be reformulated as:

$$\max_{A \subseteq \Psi} \{h(A)\}, \; \text{s.t.} \; A \in \underline{I} \quad (9)$$

Some comments on this reformulation are on order. Firstly, from the definition of $\underline{I}$, it follows that, by restricting $A \in \underline{I}$, it is ensured that each user is selected at most once with one mode and that the associated bit loading is feasible, thereby meeting the per-user mode and bit loading constraints of Equation (4). Then, the definition of the set function h(.) ensures that each RB is implicitly assigned to at most one user (since only the weighted throughput of at most one user is chosen via the inner max(·) function) and that the linear inequality constraints are imposed in determining the weighted sum rate (via the indicator variables $\{z_n\}$). Consequently, any feasible solution to Equation (9) maps to a feasible one for Equation (4) yielding the same objective value and vice versa. Then, the following theorem (Theorem 1) results: The set function h(.) is a normalized non-decreasing submodular set function and $(\Psi, \underline{I})$ is a matroid.

To prove the submodularity of the set function, we first establish that $$h(A \cup \underline{e}') - h(A) \geq h(B \cup \underline{e}') - h(B) \quad (10)$$

for any two subsets A, B$\subseteq\Psi$ with A$\subseteq$B and any element $\underline{e}'=(u', m', b') \in \Psi$ whose bit loading vector b' satisfies $b'_t>0$ for any one RB t$\in$N, whereas $b'_n=0$ $\forall n\in N$, n$\neq$t. Let E$\subseteq\Psi$ denote the set of all such elements whose bit loading vectors have a positive entry in at most one RB. An NL length vector $\Delta^A$, is first defined, wherein $$\Delta_n^A = \max_{(u,m,b)} \{\psi_n b_n (1 - p_{u,n}^m(b_n, \rho))\} \forall\, n \in N.$$

Then, L sets $R_l^A, l=1, \ldots, L$ are defined in a recursive manner as follows.

The set $R_1^A$ is defined as the set containing the min$\{J, J_1\}$ RBs corresponding to the min$\{J, J_1\}$ largest members of $\{\Delta_n^A\}_{n\in N_1}$. The set $R_2^A$ is defined as the set containing the min$\{J, J_1+J_2\}$ RBs corresponding to the min$\{J, J_1+J_2\}$ largest members of $\{\Delta_n^A\}_{n\in N_2 \cup R_1^A}$. Similarly, each set $R_l^A$, $\forall l=3, \ldots, L$ is defined as the set containing the min$\{J, J_1+J_2++J_l\}$ RBs corresponding to the min$\{J, J_1+J_2+\ldots+J_l\}$ largest members of $\{\Delta_n^A\}_{n\in N_l \cup R_{l-1}^A}$. With this definition, note that h(A) can be computed using Equation (8) by setting indicator variables $\{z_n\}$ to be equal to one for all RBs in $R_L^A$ and equal to zero for all other RBs. Then, the following telescoping relations can be shown:

$$R_L^A \cap N_l \subseteq R_{L-1}^A \cap N_l \subseteq \ldots \subseteq R_l^A \cup N_l, \forall l=1, \ldots, L \quad (11)$$

Next, the weighted rate barrier at each RB n, $V_n^A$, $n\in N_l$, $1\leq l \leq L$ is defined as $$V_n^A = \max\{\Delta_n^A, \max\{V_{min,l}^A, V_{min,l+1}^A, \ldots, V_{min,L}^A\}\},$$

where $$V_{min,l}^A = \min_{n \in R_l^A} \{\Delta_n^A\}, \forall\, l\colon 1 \leq l \leq L.$$

The operational meaning of the weighted rate barrier at RB n, $V_n^A$, is that if A is augmented by adding any element $\underline{e}=(u,m,b)\in E$:

$$b_n>0, \text{then } h(A\cup\underline{e})-h(A)=(\psi_n b_n(1-p_{u,n}^m(b_n))-V_n^A)^+,$$

where $(x)^+=\max\{0, x\}$ for any real-valued scalar x. In other words, the weighted throughput offered by the added element on RB n, $\psi_n b_n (1-p_{u,n}^m(b_n))$, must exceed the barrier $V_n^A$ to improve the objective.

In an analogous manner, the sets $R_l^B$, $\forall l\colon 1\leq l\leq L$, the vector $\Delta^B$, and the weighted rate barrier at each RB n, $V_n^B$, $n\in N$ are defined. We have the following deductions:

$$\Delta_n^A \leq \Delta_n^B, \forall n \in N,$$

$$V_{min,l}^A \leq V_{min,l}^B, \forall\, l\colon 1\leq l\leq L$$

Combining these two fact, the following is obtained:

$$V_n^A \leq V_n^B \forall n \in N \quad (12)$$

Next, upon defining $G=\psi_t b_t(1-p_{u,t}^m(b_t,\rho))$, it can be seen that $h(A\cup\underline{e}')-h(A)=(G-V_n^A)^+$ and $h(B\cup\underline{e}')-h(B)=(G-V_n^B)^+$. Invoking Equation (12), it can now be verified that Equation (10) holds true. This result is leveraged to show that Equation (10) holds for any element $\underline{e}'=(u', m', b')\in\Psi/B$, without the restriction that $\underline{e}'\in E$, thereby proving Theorem 1. For convenience, the notation is adopted that, for all $n=1, \ldots, NL$, $b'_{(n)}$ denotes the NL length vector formed by retaining the first n components of b' and setting the remaining ones to zero, i.e., $b'_{(n)}=[b'_1, \ldots, b'_n, 0, \ldots, 0]$. Similarly, $b'_{\tilde{n}}$ denotes the NL length vector formed by retaining only the $n^{th}$ component of b' and setting all the other ones to zero, i.e., $b'_{\tilde{n}}=[0, \ldots, b'_n, 0, \ldots, 0]$. Considering the difference $h(B\cup\underline{e}')-h(B)$, it is expanded as:

$$h(B\cup\underline{e}')-h(B)=h(B\cup(u',m',b'_{(1)}))-h(B)+\Sigma_{n=2}^{NL}(h(B\cup (u',m',b'_{(n)}))-h(B\cup(u',m',b'_{(n-1)}))) \quad (13)$$

From this proven result, it can be seen that, since $(u', m', b'_{(1)})\in E$, $h(B\cup(u', m', b'_{(1)}))-h(B)\leq h(A\cup(u', m', b'_{(1)}))-h(A)$. Notice, then, from the definition of the set function h(.) (8), that, for any set B$\subseteq\Omega$, $$h(B\cup(u',m',b'_{(n)}))-h(B\cup(u',m',b'_{(n-1)}))=h((B\cup(u',m',b'_{(n-1)}))\cup(u',m',b'_{\tilde{n}}))-h(B\cup(u',m',b'_{(n-1)}))$$

Noting that, since each element $(u', m', b'_{\tilde{n}})\in E$, it enables the result proved earlier to be invoked and the following to be deduced:

$$h((B\cup(u',m',b'_{(n-1)}))\cup(u',m',b'_{\tilde{n}}))-h(B\cup(u',m',b'_{(n-1)}))\leq h((A\cup(u',m',b'_{(n-1)}))\cup(u',m',b'_{\tilde{n}}))-h(A\cup(u',m',b'_{(n-1)}))=h(A\cup(u',m',b'_{(n)}))-h(A\cup(u',m',b'_{(n-1)}))$$

Combining this fact and Equation (13), the desired result is achieved.

From Theorem 1 it can be inferred that the reformulated problem in Equation (9) is one of maximizing a submodular objective subject to one matroid constraint. Thus, the classical greedy method can be adapted for the latter optimization problem. However, the main hurdle to overcome is that of selecting the locally optimal element (given a set of selected elements). In particular, the sub-problem to solve at each iteration, given a set a of 3-tuples selected so far, for each un-selected user u and mode m can be posed as:

$$\max_{b\in R_+^{NL}, b_n\in B^m \forall n\in N \& \Sigma_{n\in N} b_n \leq Q_u} \{h(\hat{G}\cup(u,m,b))-h(\hat{G})\} \quad (14)$$

An important observation that follows from the submodularity of h(.) is the following:

The problem in Equation (14) is equivalent to the maximization of a normalized non-decreasing submodular set function subject to one knapsack constraint. Thus, Equation (14) can itself be solved approximately using an enhanced greedy method. Notice that the knapsack constraint becomes vacuous for the full buffer traffic model and, in this case, the enhanced greedy method returns the optimal solution.

The proposed methods according to the present invention are adaptations of the classical greedy algorithm that, at each iteration, invokes the enhanced greedy method, to the particular problem at hand (Equation (9)). Then, invoking the approximation guarantee derived for the classical greedy method when used to maximize a submodular set function under a matroid constraint, with an approximately locally optimal choice at each step, the following theorem (Theorem 2) is obtained:

Let $O^{opt}$ denote an optimal solution to Equation (9) and let O denote the one yielded by method 500 (of FIGS. 5-6).

Then, $$h(O) \geq \frac{\eta h(O^{opt})}{\eta + 1}, \quad (15)$$

where the constant $\eta=1-(1/\sqrt{e})$. In another embodiment, wherein there is a backlogged (full buffer) traffic model, $\eta=1$.

Hereinafter, a method 500 and a method 600 will be described with respect to FIG. 5 and FIGS. 6-7, respectively. It is to be appreciated that method 500 pertains to an outer greedy stage of the present invention, and method 600 pertains to an inner greedy stage of the present invention.

Referring now to FIG. 5, an exemplary method 500 for optimizing energy efficiency over energy-harvesting LTE cellular networks is illustratively depicted in accordance with an embodiment of the present invention.

At step 505, input the following: a user set (set of users); a set of modes; at least one queue size, at least one per-RB transmit energy level, any consistent L cardinality limits; a module to compute expected throughput on any RB for any user, any mode, and any permissible bit loading.

At step 510, define a ground set of all feasible 3-tuples (user, mode, permissible bit-loading vector). Also, define a set (different from the ground set) that includes all selected 3-tuples. Initialize the latter set to the null (empty) set.

At step 515, using method 600 (as described with respect to FIG. 6), select and add to the set, the 3-tuple such that the user in that 3-tuple has not been selected before and the 3-tuple offers approximately the best incremental gain in weighted sum rate utility among all 3-tuples including such users.

At step 520, determine if all users have been selected or if the maximum possible number of users have been selected or if the approximately best gain equal to zero. If so, then proceed to step 525. Otherwise, return to step 515.

At step 525, incorporate the set of selected 3-tuples into a processor-based downlink scheduler of a base station to cause the downlink scheduler to perform downlink scheduling in accordance with the set of selected 3-tuples.

Referring now to FIGS. 6-7, another exemplary method 600 for optimizing energy efficiency over energy-harvesting LTE cellular networks is illustratively depicted in accordance with an embodiment of the present invention.

At step 605, input the following: an unselected user set (set of unselected users); at least one queue size; at least one transmit per-RB transmit energy level; L cardinality limits; and a module to compute expected throughput on any RB for any user, any mode, and any permissible bit loading, and selected set of 3-tuples.

At step 610, consider an unselected user and each mode. Define a vector of selected permissible bit-loadings and initialize it to a vector of all zeros.

At step 615, considering all RBs, determine the RB and associated permissible bit loadings such that a normalized gain is maximized over each RB and each bit-loading is permissible under that mode, subject to the sum of that bit-loading and all previously selected bit-loadings not exceeding the queue size of that user.

At step 620, select the bit-loading and update the vector of selected bit loadings.

At step 625, determine if the maximal normalized gain is equal to zero or does the sum of the bit loadings in the selected bit loading vector exceed the queue size for that user. If so, then proceed to step 630. Otherwise, return to step 615.

At step 630, store the 3-tuple formed by the considered user, mode, and determined bit-loading vector, and compute a gain.

At step 635, determine if all modes and unselected users have been considered. If so, then proceed to step 640. Otherwise, return to step 610.

At step 640, output the 3-tuple yielding the largest gain among all of the stored 3-tuple s.

The computation of the normalized gain in step 615 of FIG. 6 is now detailed. We suppose that the following are available: set of selected 3-tuples, L cardinality limits, a user and mode under consideration, vector of selected bit loadings for that user and mode, queue size of that user, set of optimal RBs for the selected set of 3-tuples, the vector of selected bit loadings.

Determine a set of bottleneck subframes using the optimal RB set and the cardinality limits. A bottleneck subframe is one where the cardinality constraint is active, i.e., it is a subframe for which the number of RBs contained in the optimal RB set, which either belong to that subframe or ones preceding it, is equal to the maximum number of RBs that can be selected up-to that subframe under the given cardinality limits.

Determine a weighted rate barrier for each RB using the set of bottleneck subframes.

The normalized gain obtained upon choosing any permissible bit loading on any RB can be determined as the ratio of the positive part of the difference between the weighted rate offered by the said bit loading on that RB and weighted rate barrier, to the permissible bit loading.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for optimizing energy efficiency over an energy-harvesting Long Term Evolution cellular network, the method comprising:

assigning (a) resource blocks, (b) transmission modes, and (c) bit loadings on the resource blocks to a set of users such that (i) the assigned resource blocks satisfy a system of linear ascending inequality constraints, and (ii) respective sums of the bit loadings for each of the users do not exceed respective queue sizes pertaining to the each of the users; and incorporating a resource block and transmission mode assignment for a user into downlink scheduler of a base station to cause the downlink scheduler to perform downlink scheduling in accordance with the resource block and transmission mode assignment.

2. The method of claim 1, further comprising:
defining a ground set of 3-tuples, each 3-tuple including a user from the set of users, a transmission mode from the transmission modes, and a bit-loading vector;
defining an empty 3-tuple set; and
adding, to the empty 3-tuple set to create a final set of 3-tuples, a 3-tuple from the ground set that meets the following 3-tuple selection criteria: (i) the user in the 3-tuple has not previously been selected; and (ii) the 3-tuple provides at least a guaranteed fraction of a highest incremental gain in a weighted sum rate utility among all such 3-tuples,
wherein said incorporating step comprises incorporating the final set of selected 3-tuples into the downlink scheduler of the base station to cause the downlink scheduler to perform downlink scheduling in accordance with the final set of 3-tuples.

3. The method of claim 2, wherein the adding step is repeated until none of the 3-tuples meet the 3-tuple selection criteria.

4. The method of claim 2, further comprising determining the incremental gain under a set of linear ascending inequality constraints.

5. The method of claim 2, further comprising storing a given one of the 3-tuples for a given one of the users when a maximal normalized gain is equal to zero, or a sum of bit loadings in the bit loading vector for the given one of the users is greater than or equal to a respective one of the queue sizes pertaining to the given one of the users.

6. The method of claim 1, wherein said assigning step assigns each of the users only one of the transmission modes, which are selected from a finite set of transmission modes.

7. The method of claim 1, wherein said assigning step is performed under an orthogonality constraint on each of the resource blocks such that at most one of the users can be assigned on each of the resource blocks, and under a user limit constraint such that a number of users assigned at least one resource block cannot exceed a certain threshold.

8. The method of claim 1, wherein said assigning step is performed under a constraint such that a given one of the transmission modes on all of the resource blocks allocated to a same one of the users is identical over a scheduling block.

9. The method of claim 1, wherein said assigning step is performed under a transmit energy constraint such that a transmit energy extended over each of the resource blocks used for data transmission is identical, the transmit energy selected from a finite set of positive transmit energy values.

10. The method of claim 1, wherein said assigning step is performed under an energy causality constraint that limits a number of the resource blocks assigned in a subframe based on cardinality limits, an amount of energy stored in a battery at a start of the resource block, an amount of consumed energy per subframe, and a power amplifier efficiency value.

11. A computer program product for performing downlink scheduling in Long Term Evolution-Advanced networks, the computer program product comprising a non-transitory computer readable storage medium having program instructions embodied therewith, the program instructions executable by a computer to cause the computer to perform a method comprising:
assigning (a) resource blocks, (b) transmission modes, and (c) bit loadings on the resource blocks to a set of users such that (i) the assigned resource blocks satisfy a system of linear ascending inequality constraints, and (ii) respective sums of the bit loadings for each of the users do not exceed respective queue sizes pertaining to the each of the users; and
incorporating a resource block and transmission mode assignment for a user into downlink scheduler of a base station to cause the downlink scheduler to perform downlink scheduling in accordance with the resource block and transmission mode assignment.

12. The computer program product of claim 11, further comprising:
defining a ground set of 3-tuples, each 3-tuple including a user from the set of users, a transmission mode from the transmission modes, and a bit-loading vector;
defining an empty 3-tuple set; and
adding, to the empty 3-tuple set to create a final set of 3-tuples, a 3-tuple from the ground set that meets the following 3-tuple selection criteria: (i) the user in the 3-tuple has not previously been selected; and (ii) the 3-tuple provides at least a guaranteed fraction of a highest incremental gain in a weighted sum rate utility among all such 3-tuples,
wherein said incorporating step comprises incorporating the final set of selected 3-tuples into the downlink scheduler of the base station to cause the downlink scheduler to perform downlink scheduling in accordance with the final set of 3-tuples.

13. The computer program product of claim 12, wherein the adding step is repeated until none of the 3-tuples meet the 3-tuple selection criteria.

14. The computer program product of claim 12, further comprising determining the incremental gain under a set of linear ascending inequality constraints.

15. The computer program product of claim 12, further comprising storing a given one of the 3-tuples for a given one of the users when a maximal normalized gain is equal to zero, or a sum of bit loadings in the bit loading vector for the given one of the users is greater than or equal to a respective one of the queue sizes pertaining to the given one of the users.

16. The computer program product of claim 11, wherein said assigning step assigns each of the users only one of the transmission modes, which are selected from a finite set of transmission modes.

17. The computer program product of claim 11, wherein said assigning step is performed under an orthogonality constraint on each of the resource blocks such that at most one of the users can be assigned on each of the resource blocks, and under a user limit constraint such that a number of users assigned at least one resource block cannot exceed a certain threshold.

18. The computer program product of claim 11, wherein said assigning step is performed under a constraint such that a given one of the transmission modes on all of the resource blocks allocated to a same one of the users is identical over a scheduling block.

19. The computer program product of claim 11, wherein said assigning step is performed under a transmit energy constraint such that a transmit energy extended over each of the resource blocks used for data transmission is identical, the transmit energy selected from a finite set of positive transmit energy values.

20. The computer program product of claim 11, wherein said assigning step is performed under an energy causality constraint that limits a number of the resource blocks assigned in a subframe based on cardinality limits, an amount of energy stored in a battery at a start of the resource block, an amount of consumed energy per subframe, and a power amplifier efficiency value.

* * * * *